United States Patent [19]

Twerdochlib

[11] Patent Number: 4,831,875
[45] Date of Patent: May 23, 1989

[54] WATER TRAP VALVE FOR FAIL SAFE OPERATION OF AN AIR INLEAKAGE MONITORING SYSTEM IN A STEAM TURBINE

[75] Inventor: Michael Twerdochlib, Oviedo, Fla.

[73] Assignee: Westinghouse Electric Corp., Pittsburgh, Pa.

[21] Appl. No.: 44,627

[22] Filed: May 1, 1987

[51] Int. Cl.4 .................. B21B 27/06; F16K 9/00
[52] U.S. Cl. ........................ 73/202; 73/200; 73/198; 73/861.42; 137/247.11
[58] Field of Search ........... 73/202, 198, 861.42, 73/203, 861.52; 137/110, 247.11, 247.33, 247.41; 4/197, 206, 207

[56] References Cited

U.S. PATENT DOCUMENTS

| | | | |
|---|---|---|---|
| 201,090 | 3/1878 | Brandeis | 137/247.11 |
| 245,674 | 8/1881 | Titus | 137/247.15 |
| 268,584 | 12/1882 | Williams | 137/247.11 |
| 274,465 | 3/1883 | Collings | 137/247.11 |
| 286,746 | 10/1883 | Thomas | 137/247.11 |
| 782,760 | 2/1905 | Savard | 137/247.11 |
| 1,191,415 | 7/1916 | Gibson | 73/861.01 |
| 2,603,304 | 7/1952 | Carrier | 137/247.11 |
| 2,745,510 | 5/1956 | Hultgren | 210/532.1 |
| 4,456,173 | 6/1984 | Miner et al. | 73/200 |
| 4,461,173 | 7/1984 | Olin | 73/203 |
| 4,574,399 | 3/1986 | Sullivan | 4/206 |

Primary Examiner—Joseph A. Orsino
Assistant Examiner—Anh H. Tran

[57] ABSTRACT

Fail-safe bypass monitoring system for measuring volumetric flow rates in a pipe which normally carries a relatively low pressure, low volume gas flow. The system comprises a water trap valve positioned to seal off relatively low pressure gas flow through the pipe and divert the gas flow through a flowmeter. The flowmeter receives gas flow from the pipe adjacent a first end of the water trap valve and returns gas flow to the pipe adjacent a second end of the water trap valve. The water trap valve always passes relatively high pressure gas directly through the pipe.

15 Claims, 2 Drawing Sheets

WATER TRAP VALVE FOR FAIL SAFE OPERATION OF AN AIR INLEAKAGE MONITORING SYSTEM IN A STEAM TURBINE

This invention relates to fluid flow monitoring systems and, more particularly, to a bypass system for fail safe continuous monitoring of low pressure gas flow.

BACKGROUND OF THE INVENTION

Volumetric flow rates at which gases travel through conduits or pipes are at times measured by placing a flowmeter directly in the gas flow path. When relatively low levels of flow, e.g., two to fifty cubic feet per minute (CFM), are monitored in relatively large pipes, e.g., pipes six or more inches in diameter, the low level flow may be bypassed through a smaller diameter pipe in order to increase the velocity of fluid flow and thereby improve the accuracy of measurement. For example, air inleakage in steam turbines is actively exhausted in order to minimize corrosion of turbine components and to reduce vibration in low pressure turbine blading. Efforts are made to keep air inleakage rates below ten CFM during normal operating conditions, but rates may range up to 400 CFM during turbine start up. High compression ratio pumps for exhausting this wide range of flow are designed to operate under low back pressure. Any increase in exhaust back pressures exceeding five PSI above atmospheric pressure may damage the pump seals. Consequently, the vent pipes which exhaust this air are at least six inches in diameter and may be larger for long pipe lengths in order to minimize rises in back pressure when the pumps displace large volumes of air.

Flowmeters which have been used for measuring volumetric exhaust rates in these vent pipes have required a minimum flow velocity of approximately 50 feet per minute in order to maintain an acceptable level of accuracy. However, the velocity of a one CFM flow through a six inch pipe is on the order of only five feet per minute. Therefore it has been necessary to bypass turbine exhaust air through a flow monitor having a markedly smaller inside diameter than the vent pipe in order to bring the exhaust air velocity into an acceptable range for measuring volumetric flow rates. When a flowmeter is connected in parallel with the vent pipe, the bypass valve used to divert exhaust flow to the flowmeter must completely seal off the vent pipe in order to sustain accurate measurements. During normal low flow operations the valve remains closed in order to effect continuous monitoring. When the exhaust flow rate increases, e.g., due to a sudden inleakage of air to the turbine system, the bypass valve must be quickly opened in order to avoid excesscive back pressure which would result from moving the increased volume of gas through the relatively small diameter flowmeter pipe.

Valves which have been used in the past for bypassing exhaust air to a flowmeter are believed to have several undesirable limitations. For example, wear along metallic closing surfaces of conventional stop valves may result in a failure to create a tight seal. The resulting leakage through the stop valve may escape detection and result in spurious flow data. Secondly, some valves have been known to occasionally stick in a closed position, thereby presenting a potential cause of damage to the turbine system. A fail-safe open bypass valve would provide the fullest protection to the turbine blading and the pump seals when back pressure increases. It is therefore desirable to have a bypass valve which provides a complete seal when closed and which vents exhaust gases when back pressure exceeds a predetermined safe value.

SUMMARY OF THE INVENTION

It is an object of the present invention to provide a bypass valve which seals off flow to an exhaust vent pipe under relatively low pressures and which freely opens when gas pressure exceeds a minimum value.

It is another object of the invention to provide an improved bypass valve which is relatively inexpensive and reliable.

It is a further object of the present invention to provide an improved normally closed bypass valve which is fail-safe open.

In one form, the present invention comprises a water trap positioned in a large diameter gas flow pipe to function as a normally closed fast acting valve. When pressure differentials across the water trap are relatively small the valve completely seals off flow. Whenever the pressure differential across the valve exceeds a threshold value the gas freely passes through the water trap to prevent the build up of excessive back pressure which might otherwise damage the pump and, ultimately, the turbine components.

In a preferred embodiment, the water trap valve comprises a horizontally oriented tube having first and second upwardly extending partitions partially blocking the tube. The partitions define a water reservoir within the tube. A third downwardly extending partition between the first and second partitions has a lower end extending into any water contained in the reservoir. The water acts to block low pressure air flow through the tube. If air pressure increases, the water is displaced by the differential pressure thereacross allowing air to pass around the third partition and to bubble out of the reservoir. Water volume and partition size are selectable to permit fail safe passage of air at predetermined pressures. When implemented in a flow rate monitoring system, a flow meter is connected in shunt with the water trap valve. The valve functions to block low pressure air thereby allowing the flowmeter to provide accurate flow readings. If pressure increases in response to unusual high flow rates, the valve allows air to pass in a fail safe manner.

BRIEF DESCRIPTION OF THE DRAWINGS

For a better understanding of the present invention, reference may be had to the following detailed description taken in conjunction with the accompanying drawing in which.

DETAILED DESCRIPTION OF THE PREFERRED EMBODIMENT

Figure 1:
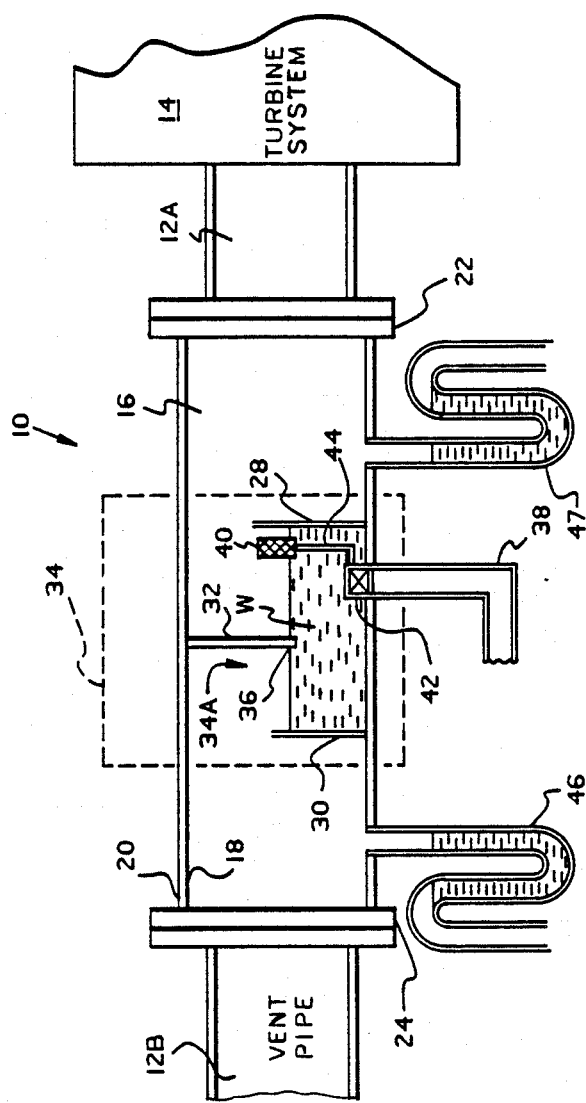
FIG. 1 is a cross-sectional view of one form of the inventive water trap valve applied to a large diameter flow pipe in a fluid exhaust system.

With reference to FIG. 1 there is illustrated in one form of the invention a water trap valve 10 for sealing off a normally low pressure gas flow between two segments 12A and 12B of a vent pipe which removes air inleakage from a large steam turbine system indicated at 14. The inventive valve 10 comprises a flanged tube 16 having an annular inner wall 18, an outer wall 20, a first end 22 adapted for connection to a flanged end of the first vent pipe segment 12A and a second tube end 24 adapted for connection to a flanged end of the second vent pipe segment 12B. The tube 16 includes first and second lower partitions 28 and 30, spaced apart along the tube inner wall 18, and an upper, intermediate partition 32 extending downward (in the orientation of FIG. 1) from the tube inner wall 18 forming a water trap 34 along the tube 16. The lower partitions 28,30 define a reservoir 34A for holding water or other liquid. The upper partition 32 extends between the lower partitions 28 and 30 so that when the trap 34 is filled with water W to a level which immerses the lower end 36 of the upper partition 32, relatively low pressure gas flow is blocked. The orientation of the water valve 10 must be maintained as shown in FIG. 1 to confine water W to the valve, i.e., the tube 16 is oriented such that air flow is in a horizontal direction and upper and lower are relative to a vertical direction or, more specifically, relative to a gravitational line of force. The partitions 28 and 30 are attached to the inner wall 18 by, for example, welding. The partitions, for an assumed annular pipe, extend approximately half-way around the inner circumference of wall 18 so that the water level is about half the diameter of tube 16. The partition 32 extends around the inner circumference somewhat more than half-way so that its lower edge 36 is immersed in water W.

A supply pipe 38 is threaded through the tube 16 between the first and second lower partitions 28 and 30 in order to fill the trap 34 with water. The supply pipe 38 may provide a continuous charge of water at a nominal rate. Alternatively, water level in the trap 34 is controllable by a float device 40 positioned in the trap 34 between the upper partition 32 and the first lower partition 28. The float device is connected to a fill valve 42 by a lever arm 44. The fill valve 42 is opened by the float device 40 to admit water from the supply pipe 38 whenever the amount of water in the trap falls below a preselected height. The float device 40 also closes the fill valve 42 whenever the water exceeds a preselected maximum height. In an alternate form of the invention the fill valve 42 may be controlled by a timer (not illustrated) to provide intermittent charges of water, e.g., one half gallon once a day, to assure that the water trap 34 is filled.

The first lower partition 28, positioned between the second lower partition 30 and the first tube end 22, extends above the second lower partition 30 so that excess trap water will spill over the second lower partition 30 and into a water trap drain 46. This drain arrangement assures removal of excess water from the valve 10 and the second vent pipe segment 12B. A second water trap drain 47 may be added to further eliminate any water present in the first segment 12A of the vent pipe which may flow toward the turbine system 14.

Figure 2:
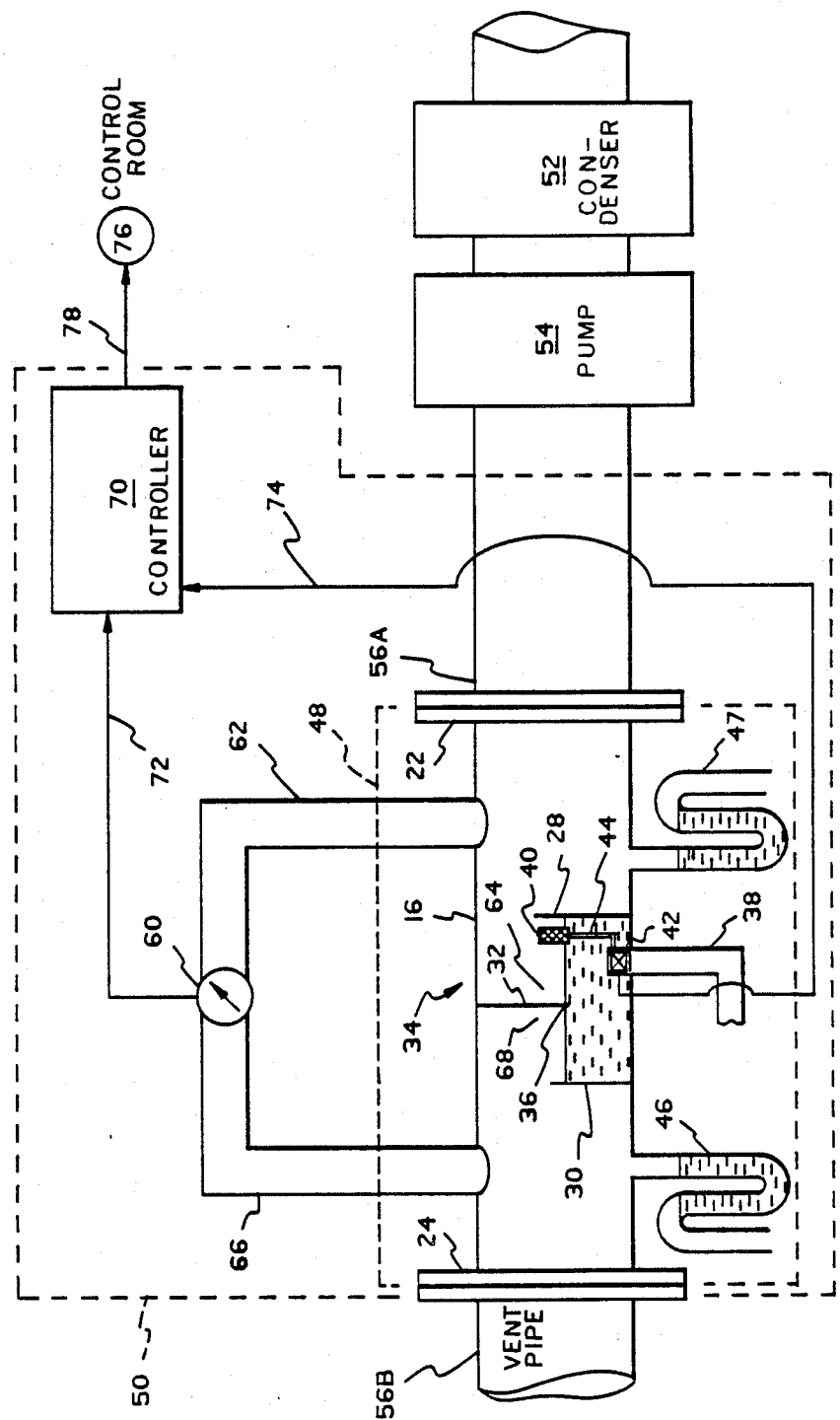
FIG. 2 illustrates application of the water trap valve of FIG. 1 to a bypass flowmeter monitoring system for a steam turbine.

Before describing the operation of the inventive water trap valve, reference is made to FIG. 2 which illustrates a bypass monitoring system 50 utilizing one form of the water trap valve for measuring the volumetric flow rate of air inleakage being evacuated from a condenser 52 forming part of a steam turbine system. The monitoring system 50 comprises a water trap valve 48 which incorporates the features and components of the water trap valve 10 illustrated in FIG. 1. Reference numbers in FIG. 2 which correspond to reference numbers in FIG. 1 refer to similar components which have been described for the water trap valve 10.

The water trap valve 48 is positioned between first and second vent pipe segments 56A and 56B. A pump 54 evacuates air inleakage from the condenser 52 through the first vent pipe segment 56A. The pump 54 may comprise a vacuum pump or a hogger in combination with a steam ejector. A flowmeter 60 is positioned to receive gas from a small diameter pipe 62 connected to the flanged tube 16 on a first side 64 of the upper partition 32 and adjacent the first tube end 22. A second small diameter pipe 66 is positioned to return gas from the flowmeter 60 to the flanged tube 16 on a second side 68 of the upper partition 32 adjacent the second tube end 24.

The flowmeter 60 provides data indicative of volumetric air inleakage rates to a controller 70 through a first signal line 72. The controller 70 may be an electrical circuit or a microprocessor based device. A second signal line 74, connected to the fill valve 42, carries data to the controller 70 indicating whether the fill valve 42 is in an open or a closed position in order to detect valve malfunctions. In lieu of the illustrated float device 40, fill valve operation may be regulated by the controller 70 to provide intermittent charges of water from the supply pipe 38. The controller may also provide information to a control room 76 along a third signal line 78 indicating flow rate and the operational status of the water trap valve 48.

The water trap valve bypass monitoring system 50 operates in the following manner. Under steady state turbine conditions the water trap 34 is filled to a level which immerses the lower portion 36 of the upper partition 32. This blocks relatively low pressure fluid (air) flow through the trap 34 in order to divert the fluid through the flowmeter 60. When the fluid flow rate rises, the lower flow capacity of conduits 62 and 66 causes the pressure differential across the water trap 34 to also rise. As the pressure differential increases, the water level between the upper partition 32 and the first lower partition 28 becomes depressed, causing the water level between the upper partition 32 and the second lower partition 30 to rise.

At a predetermined threshold pressure differential the water level between the upper partition 32 and the lower partition 28 will be depressed to the bottom of the upper partition, forcing water to rise and spill over the second lower partition 30. Under this condition, air passes beneath the upper partition 32 and bubbles out of the water between the upper partition 32 and the second lower partition 30. With the float device 40 positioned between the upper partition 32 and the first lower partition 28, the fill valve remains open as this process occurs. This causes water to continually spill over the second lower partition 30. When the pressure differential across the water trap 34 decreases below the threshold value, water in the trap 34 resumes its normal level and the float device 40 closes the fill valve 42. Thus, the water trap valve 48 is normally closed under relatively low pressure conditions and fail safe open when air pressure rises above a threshold value.

Operation of the bypass monitoring system 50 is described by way of example. The water level in the trap 34 may be adjusted to a preselected height above the lower end 36 of the upper partition 32 so that a threshold pressure differential corresponding to a 50 CFM flow through the flowmeter 60 will permit air to pass through the water trap valve 48. When data on line 72 corresponds to a minimum flow rate of 50 CFM and data on line 74 indicates that the fill valve 42 is open, the controller 70 will provide a signal to the turbine control room 76 indicating that air is flowing through the water trap valve 48 as well as through the flowmeter 60. This information will inform control room operators that flowmeter readings do not correspond to air inleakage rates.

When the flow rate is less than the threshold value of 50 CFM and data provided by line 74 indicates that the fill valve 42 is open, the controller 70 will provide a signal to the control room indicating that either the fill valve 42 is stuck in an open position or that there is a leak in the water trap 34. When data on line 72 indicates that the flow rate is greater than 50 CFM and data on line 74 indicates that the fill valve 42 is closed, the controller 70 will provide a signal to the control room 76 indicating that either the flowmeter 60 is malfunctioning, or the fill valve 42 is stuck in a closed position.

It will be appreciated by those skilled in the art that broad application can be given to the novel water trap valve 10 in many embodiments other that those described herein. It will also be apparent to those skilled in the art that many modifications in structure, components and arrangements illustrated herein may be made in the practice of the invention and for adaption of the invention to specific applications without departing from the spirit and scope of the invention as defined by the claims.

I claim:

1. A fail-safe bypass monitoring system for measuring the volumetric flow rate of normally low pressure air inleakage evacuated from a condenser in a steam turbine system and exhausted through a vent pipe segment, said system comprising:
   (a) bypass flowmeter means, positioned to receive air from the condenser and to exhaust air through the vent pipe segment, for providing a first signal indicative of volumetric air flow rate from the condenser;
   (b) a water trap positioned between the condenser and the vent pipe segment to divert relatively low pressure air flow to said flowmeter means and for permitting air to flow directly through the vent pipe segment when air pressure between the condenser and said water trap exceeds a preselected value, said water trap comprising:
      i. a tube having an inner wall, an outer wall, a first end adapted for connection to the condenser and a second end adapted for connection to the vent pipe segment, said tube being oriented for flow there through in a horizontal direction;
      ii. first and second lower partitions attached to and spaced apart along the tube inner wall and extending vertically upward for defining a reservoir for holding water, said first lower partition positioned between said second lower partition and the first tube end; and
      iii. an upper partition extending vertically downward from the tube inner wall between said first and second lower partitions and having a lower end extending below a preselected level of water between said lower partitions for sealing off relatively low pressure air flow through the vent pipe segment;
   (c) supply means for providing water between said first and second lower partitions; and
   (d) drain means for removing excess water from the vent pipe segment.

2. The fail-safe bypass monitoring system of claim 1 wherein said supply means comprises:
   (a) means positioned along said tube between said first and second lower partitions and adapted for receiving a water supply pipe;
   (b) a fill valve coupled to said receiving means for selectively admitting water from the supply pipe into said water trap; and
   (c) a float device positioned in said water trap and operatively coupled to said fill valve for admitting water into said water trap whenever water in said water trap falls below a preselected level.

3. The fail-safe bypass monitoring system of claim 1 wherein said first lower partition extends above said second lower partition and said drain means comprises a water drain positioned along said tube between said second lower partition and the second tube end.

4. A valve for blocking a normally low pressure, low volume gas flow through a segment of pipe, comprising:
   (a) a horizontally oriented tube having a first end of receiving gas flow, a second end adapted for connection to the pipe segment, an inner wall and an outer wall; and
   (b) a water trap positioned along the inner tube wall, said water trap comprising first and second lower partitions spaced apart along the inner tube wall and an upper partition extending downward from the inner tube wall between said first and second lower partitions, said upper partition extending just below the level of the top of the first and second lower partitions such that the lower edge of the upper partition is submerged when water fills the volume between the first and second lower partitions, the volume of water overlaying the lower edge of the upper partition being sufficient to block gas flow less than a predetermined value but insufficient to block gas flow greater than the predetermined value whereby the water trap acts as a control valve for blocking low pressure gas flow.

5. The valve of claim 4 wherein said tube includes a threaded aperture positioned between the first and second lower partitions adapted to receive a water supply pipe for filling said water trap with water.

6. The valve of claim 5 further comprising:
   (a) a fill valve positioned about the aperture for controlling water flow through the supply pipe; and
   (b) a float device connected to said fill valve for admitting water from the supply pipe when water in said trap falls below a preselected level and for preventing the water level from exceeding a maximum level.

7. A fail-safe bypass monitoring system for measuring volumetric flow rates between first and second segments of pipe which carry a normally low pressure gas flow, said system comprising:
   (a) a tube having an inner wall, an outer wall, a first end adapted for connection to the first pipe segment and a second end adapted for connection to the second pipe segment;
   (b) bypass flowmeter means, connected in shunt with said tube for providing a first signal indicative of volumetric flow rates between the first and second pipe segments; and
   (c) a water trap in said tube for blocking relatively low pressure gas flow through said tube and for permitting relatively high pressure, high volume gas flow through said tube.

8. The fail-safe bypass monitoring system of claim 7 wherein said water trap comprises:
  (a) first and second lower partitions spaced apart along the tube inner wall for defining a water containing reservoir, said first lower partition positioned between said second lower partition and the first tube end;
  (b) an upper partition extending downward from the tube inner wall between said first and second lower partitions and into the water containing reservoir for sealing off relatively low pressure air flow through the second pipe segment.

9. The fail-safe bypass monitoring system of claim 8 further including an aperture positioned along said tube between said first and second lower partitions and adapted for receiving a water supply pipe.

10. The fail-safe bypass monitoring system of claim 9 further comprising:
  (a) a fill valve coupled to the aperture and adjacent the inner tube wall for selectively admitting water through the aperture and into said water trap; and
  (b) a float device positioned in said water trap and operatively coupled to said fill valve for admitting water into said water trap whenever water in said water trap falls below a preselected level.

11. The fail-safe bypass monitoring system of claim 10 further comprising control means for monitoring data provided by said bypass flowmeter means.

12. The fail-safe bypass monitoring system of claim 11 wherein said control means further comprises means for determining whether said fill valve is in an open or closed position.

13. The fail-safe bypass monitoring system of claim 8 wherein said first lower partition extends above said second lower partition.

14. The fail-safe bypass monitoring system of claim 13 further comprising a first water drain positioned along said tube between said second lower partition and the second tube end for removing water from the second pipe segment.

15. The fail-safe monitoring system of claim 14 further comprising a second water drain positioned between said first lower partition and the first tube end for removing water from the first pipe segment.

* * * * *